US005165154A

United States Patent [19]

Miller

[11] Patent Number: 5,165,154

[45] Date of Patent: Nov. 24, 1992

[54] APPARATUS FOR ATTACHING AND REMOVING SPRING CONNECTING SET OF BRAKE SHOES

[76] Inventor: Roma Miller, Gunbarrel Rd., Baldwinsville, N.Y. 13027

[21] Appl. No.: 740,084

[22] Filed: Aug. 5, 1991

[51] Int. Cl.$^5$ ............ B23D 19/04

[52] U.S. Cl. ............ 29/227; 29/267

[58] Field of Search ............ 29/267, 233, 227, 239; 254/130, 129

[56] References Cited

U.S. PATENT DOCUMENTS

| | | | |
|---|---|---|---|
| 1,543,661 | 6/1925 | Baumbach | 254/130 |
| 1,960,255 | 5/1934 | Tyroff | 254/130 |
| 2,811,772 | 11/1957 | Johnson | 29/227 |
| 3,602,973 | 9/1971 | Mata | 29/227 |
| 5,003,680 | 4/1991 | Vesely et al. | 29/267 |

*Primary Examiner*—Robert C. Watson
*Attorney, Agent, or Firm*—Katherine McGuire

[57] ABSTRACT

A tool for attaching and removing the springs extending between and interconnecting a set of brake shoes in a drum-type brake assembly comprises a rigid plate which is adapted to be slidingly and removably positioned between facing ends of the shoes adjacent the apertures in the shoes in which respective hooked ends of the spring anchor. Each surface of the plate includes a boss projecting normal therefrom which serves as a fulcrum for the second element of the invention which serves as a lever. The lever includes a distal end which is used to grasp and urge the hooked end of the spring into its' respective aperture in the shoe. This may be easily accomplished by levering the shank of the lever against the boss on the stationary plate extending between the shoes.

9 Claims, 3 Drawing Sheets

APPARATUS FOR ATTACHING AND REMOVING SPRING CONNECTING SET OF BRAKE SHOES

BACKGROUND OF THE INVENTION

This invention relates to tools used in the heavy truck brake repair industry and, more particularly, to such a tool which is used to facilitate the attachment and removal of the springs which are anchored to and bias a set of brake shoes in a direction toward each other.

Large vehicles such as heavy trucks and buses, for example, utilize air-brake systems which employ a pair of arcuate brake shoes for each wheel axle. Upon actuation of the braking system, the brake shoes are forced outwardly whereby the brake shoe linings frictionally engage the drum to cease rotation of it's associated wheel to slow and/or stop the vehicle. In the usual break arrangement, the brake shoes are positioned opposite each other with the linings thereof facing outwardly toward the drum. The shoes are mounted about a backing plate and include a set of helical springs biasing the shoes toward each other in a direction away from the drum.

The present day method of anchoring the springs to the shoes requires awkward and strenuous manual manipulation of the shoes about the springs to achieve proper positioning thereof about the backing plate. Without the aid of any tools, the worker must be able to anchor the springs to each brake shoe which requires movement of at least one of the shoes in a direction against the biasing force of the springs. This movement, if done improperly, has been known to tension the springs beyond their elastic limit which would thereafter require replacement.

In the "S cam" type of air-brake presently manufactured by Rockwell International under the trademark THE ROCKWELL Q FLUS, each brake shoe must be equipped with rollers which bear against an S-shaped cam positioned therebetween. When the braking system is actuated, the cam rotates thereby forcing the brake shoes against the drum as the rollers ride along the cam as will be understood more fully in the Detailed Description. Installation of the roller between each shoe and the ca requires the worker to force the shoe away from the cam to provide clearance for insertion of the roller (with the springs already in place). To accomplish this, the worker usually utilizes a crow-bar to insert between the brake shoe and the cam to pry them apart a distance permitting insertion of a roller therebetween. Thus, while one hand is holding the crow-bar in the position separating the shoe from the cam, the worker must use his other hand to insert the roller therebetween. A major hazard to the worker is the possibility of slippage of the crow-bar while installing the roller which could catch the worker's hand between the shoe and the cam.

Due to the above-mentioned difficulties of installing the shoes, spring and rollers of a brake, including the hazards associated therewith, the present invention is aimed towards providing a tool with which to install the springs upon a set of brake shoes.

It is therefore a main object of the present invention to provide a tool which greatly facilitates the installation of the springs upon a set of brake shoes.

It is a further object to provide a tool which reduces the amount of time required to install the springs upon a pair of brake shoes.

It is another object to provide a hand operated tool which substantially decreases the threat of injury to the user during use of the tool to install or remove the springs anchored between a pair of brake shoes.

Yet another object of the invention is to provide a tool having the above-mentioned characteristics which is simple in design, easy to use, cheap to manufacture, and which is otherwise economically attractive.

Other objects will in part be obvious and in part appear hereinafter.

SUMMARY OF THE INVENTION

In accordance with the foregoing objects, the invention comprises a hand operated tool which is used to attach and remove the springs anchored to and extending between a pair of brake shoes. The tool includes two separate elements which cooperatively operate as a unit to manipulate the springs into proper engagement with the brake shoes. The first element is a rigid plate having a predetermined outline such that it may be quickly and easily, slidingly positioned between the shoes adjacent the spring, a first, hooked end of the spring having been previously anchored to an aperture in the top shoe. The plate includes a boss projecting from either side thereof which serves as a fulcrum for the second tool of the invention which serves as a lever.

In particular, the lever element of the tool includes a handle with a linear shank extending therefrom, terminating in a free, distal end. The distal end is machined to a rounded tip and includes at least one annular groove adjacent thereto which is used to grasp the second, hooked end of the spring. With the lever positioned against the boss on the plate, the lever can be used to pull the second end of the spring into engagement with an aperture in the bottom shoe. Using the present tool and method of spring installation allows for the rollers to be positioned between the cam and the ends of the shoes opposite to which the plate is mounted prior to spring installation. This negates the need to manipulate the bottom shoe into position with the cam (following manual anchoring of the spring) and then separating the shoe from the cam to insert the rollers as is required while performing the prior method of brake installation.

DETAILED DESCRIPTION

Figure 1:
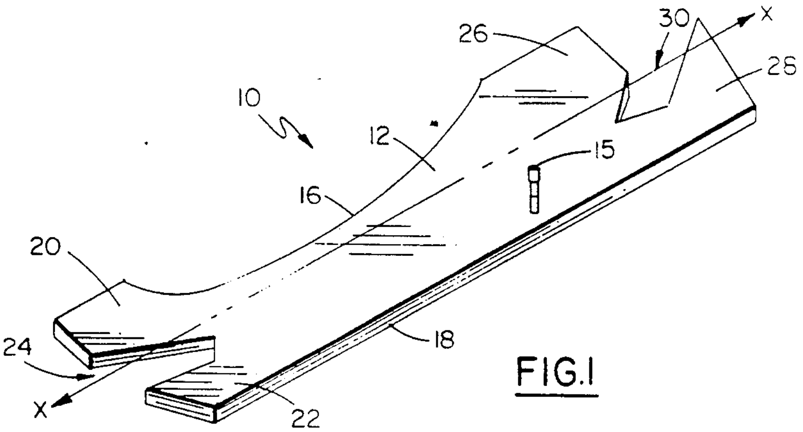
FIG. 1 is a perspective view of the first, plate component of the invention.
Figure 2:
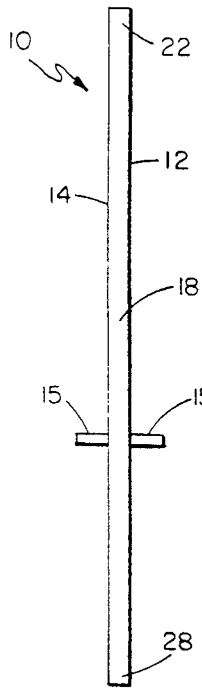
FIG. 2 is a side, elevational view of the plate of FIG. 1.
Figure 3:
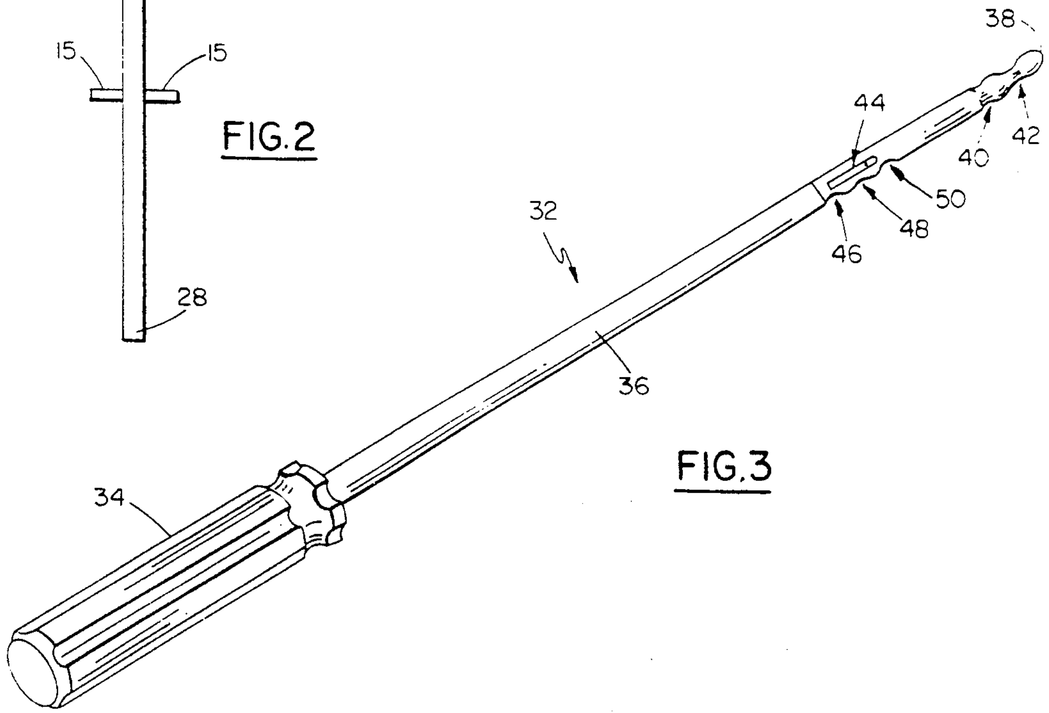
FIG. 3 is a perspective view of the second, lever component of the invention.

Referring now to the drawings, there is seen in FIGS. 1 and 2 a first component of the invention comprising a rigid, substantially planar plate 10 having opposite planar surfaces 12 and 14. Plate 10 is configured to slidingly fit between a pair of brake shoes whereby bosses 15 seen extending from opposite surfaces 12 and 14 provide a fulcrum against which the second component of the invention seen at FIG. 3 may be worked. Referring still to FIGS. 1 and 2, plate 10 is configured with a linear edge 18 and opposite, concave edge 16, edge 18 extending parallel to axis x—x. For points of reference during discussion of the operation of the invention hereinafter, edge 18 will be considered the "outside edge" and edge 16 will be considered the "inside edge". The top edge of plate 10 defines corner segments 20 and 22 with a slot 24 therebetween which extends at an angle to axis x—x towards edge 18. The bottom edge of plate 10 defines corner segments 26 and 28 with a slot 30 therebetween which, like slot 24, also extends at an angle to axis x—x towards edge 18.

Prior to discussing detailed operation of the invention, attention is turned to the second component of the invention comprising a lever-type instrument as referenced generally by the numeral 32 in FIG. Instrument 32, as used in combination with plate 10 as will be described below, includes a handle for manually grasping the instrument. A rigid, linear shank therefrom and terminates at a rounded, distal end 38. Shank 36 includes longitudinally spaced, annular grooves 40 and 42 adjacent end 38, the centerline of groove 40 being slightly larger in diameter than the centerline of groove 41. Located approximately two-thirds down the length of shaft 36 from handle is an elongated slot 44 which extends entirely through shank 36. A plurality of longitudinally spaced recesses 46, 48 and 50 are also formed in shank 36 adjacent slot 44.

Figure 4:
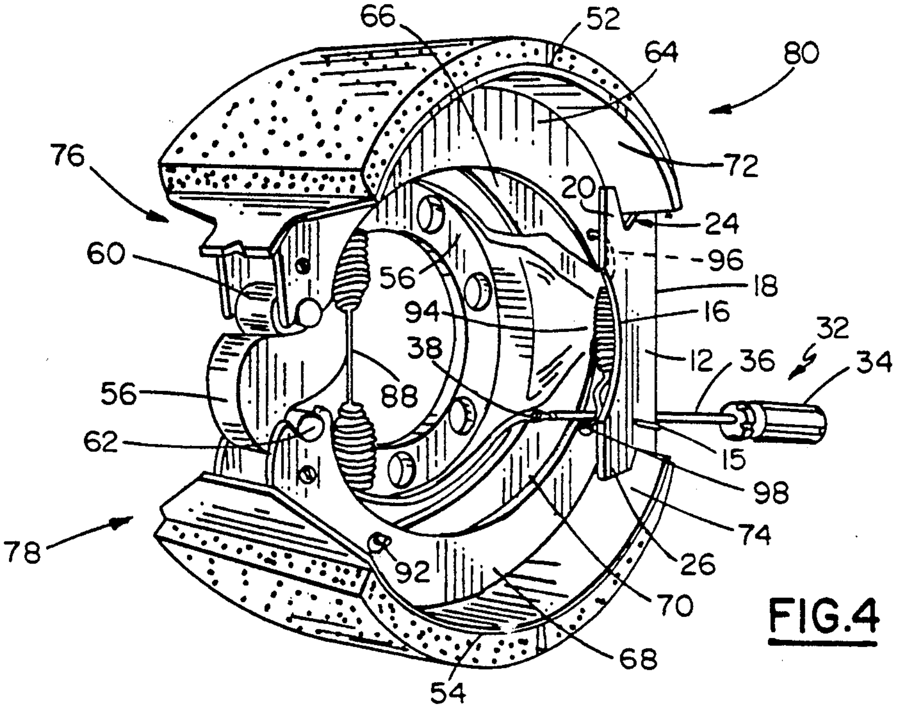
FIG. 4 is a perspective view of a drum-type brake assembly showing the plate and lever seen in FIGS. 1–3 in cooperative, working position thereon.
Figure 5:
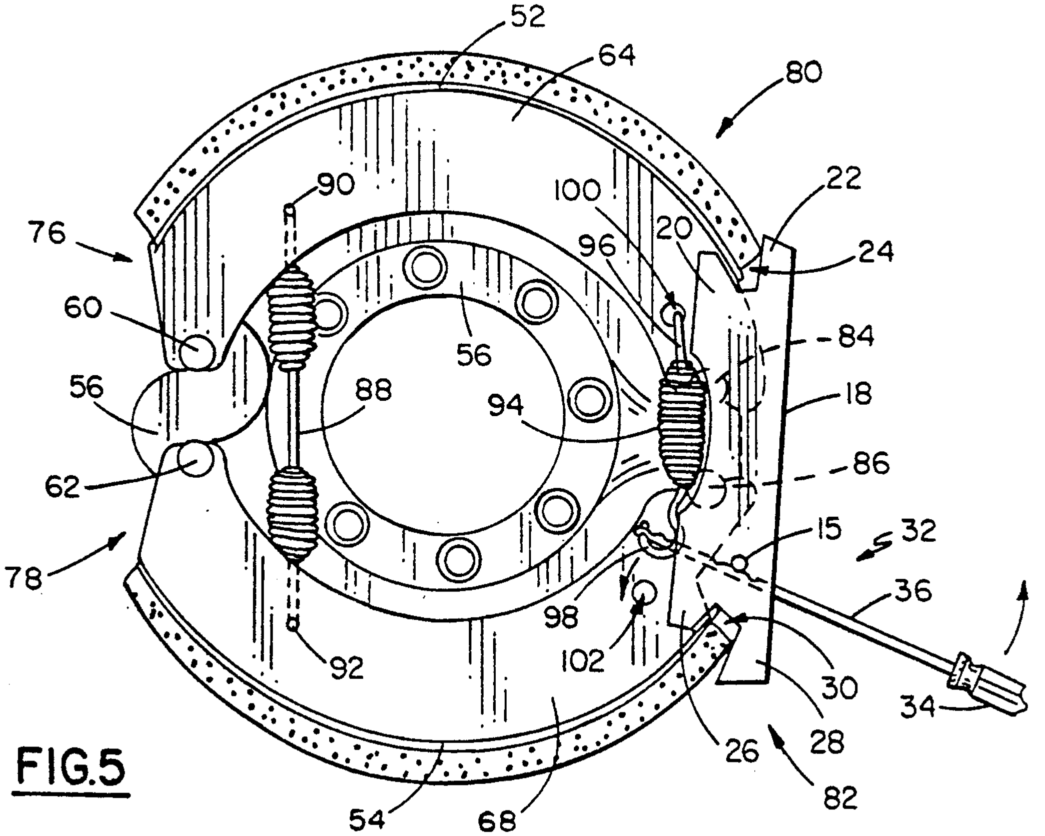
FIG. 5 is a front, elevational view of the apparatus of FIG. 4 immediately prior to anchoring the second end of the spring into the aperture in the bottom shoe.
Figure 6:
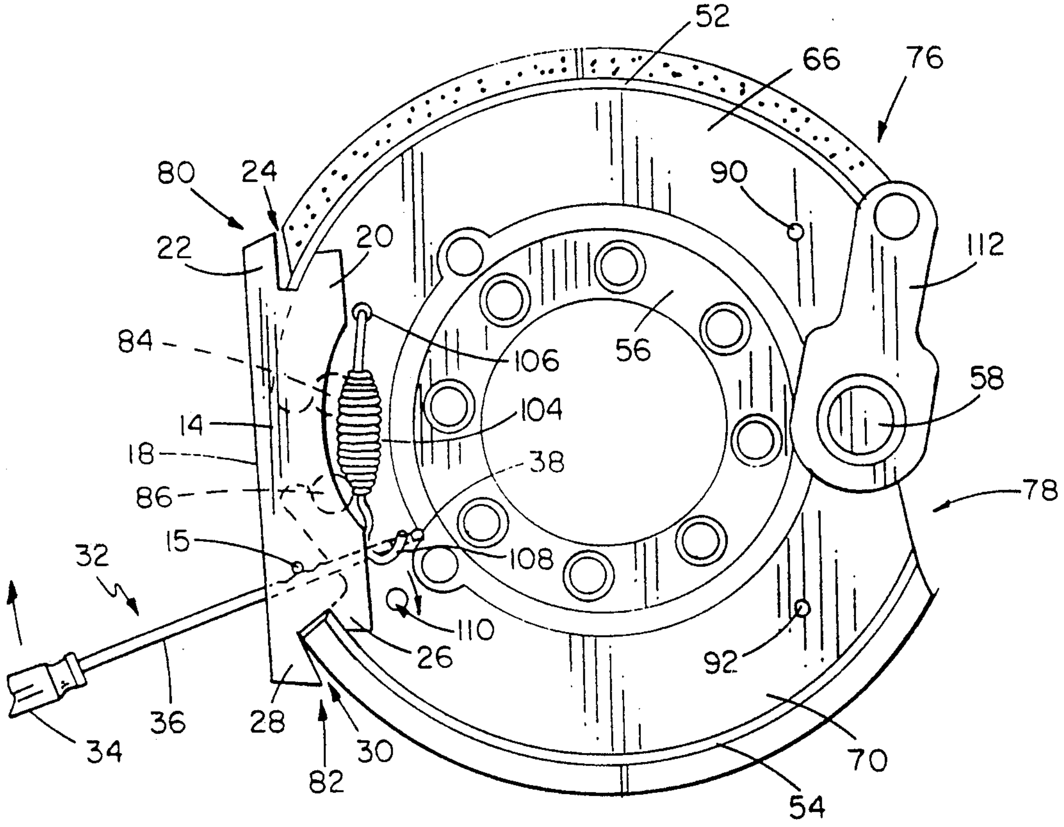
FIG. 6 is a front, elevational view of the apparatus as viewed from the opposite side than that seen in FIG. 5 and showing the plate and lever in position to pull and anchor the second end of the second spring into an aperture in the bottom shoe.

Turning attention no to the operation of the invention, a drum-type brake assembly is seen in FIGS. 4, 5 and 6 which includes a set of brake shoes 52 and 54 arranged about a backing plate 56. The brake assembly shown and described herein is the ROCKWELL Q-PLUS on which the present invention has proved especially useful, it being understood that the Q-PLUS is used herein only for purposes of illustration of operation of the present invention as it is used in connection with the assembly and repair of similar type brake assemblies. In particular, the Q-PLUS brake assembly includes the brake shoes 52 and 54 and backing plate 56 as previously mentioned. An "S" cam 56 is rotatable via shaft 58 (seen in cross-section in FIG. 6) which connects to the air-braking system of the vehicle whereby cam 56 controls the outward and inward movement of shoes 52 and 54 by bearing and moving against rollers 60 and 62, respectively, as it rotates. The shoes 52 and 54 are shown in FIGS. 4–6 in the fully retracted position, disengaged from the drum (not shown).

Each brake shoe 52 and 54 is seen to include a pair of laterally spaced, parallel flanges 64, 66 and 68, 70 traversing the inner, concave surface 72 and 74 of shoes 52 and 54, respectively. At first, facing ends 76 and 78 of shoes 52 and 54, laterally aligned grooves formed in each shoe's respective flanges are configured to receive opposite ends of rollers 60 and 62 with cam 56 positioned therebetween. The respective flanges of second, facing ends 80 and 82 of shoes 52 and 54 also include laterally aligned grooves to bear against anchor pins 84 and 86 which extend through respective apertures (not shown) in backing plate 56.

A double ended tension spring 88 attaches at either end thereof to retaining pins 90 and 92 extending through laterally aligned holes in flanges 64 and 66 in shoe 52, and in flanges 68 and 70 in shoes 52 and 54 in the retracted position (towards each other) about cam 56. Likewise, a somewhat smaller, helical spring 94 has opposite, hooked ends 96 and 98 which pass through hole 100 flange 64 of shoe 52 and hole 102 in flange 68 in shoe 54, respectively. Spring effectively biases ends 80 and 82 of shoes 52 and 54 toward each other to bear against anchor pins 84 and 86, respectively.

Utilizing the prior art method of assembling the brake assembly shown in the Figures, a worker would first set the separate shoes 52 and 54 on a flat work surface and install the retaining pins 90 and 92 into the holes in flanges 64, 66 and 68, 70 adjacent first ends 76 and 78 thereof, respectively. The first shoe 52 would then be set upon the top of backing plate 56 with the ends of flanges 64 and 66 adjacent end 76 resting upon cam 56 without roller 60 positioned therebetween. The laterally aligned grooves in the ends of flanges 64 and 66 adjacent end 80 are set upon top anchor pin 84. A first end of the large spring 88 is then attached to retaining pin 90 and allowed to hang freely therefrom. The first end 26 of small spring 94 is inserted into hole 96 and also allowed to hang freely therefrom.

Referring to FIG. 6, a second small spring 104 which is identical to spring 94 includes a first, hooked end 106 which is inserted in hole 108 in flange 66, hanging opposite spring 94 on flange 64. The worker then proceeds to attach the second brake shoe 54 to the assembly by first positioning the laterally aligned grooves in flanges 68 and 70 over either end of bottom anchor pin 86. The worker must then push the second end 78 of shoe 54 up and against shoe 52 to permit manual attachment of the bottom ends 98 and 108 of springs 94 and 104 into holes 102 and 110 in flanges 68 and 70, respectively. With flanges 68 and 70 adjacent second end 78 firmly abutting the bottom of cam 56 (without roller 62 positioned therebetween), the bottom end of large spring 88 is attached to retaining pin 92.

The final prior method step involves installation of rollers 60 and 62 between cam 56 and shoes 52 and 54, respectively. With all the springs in position, shoes 52 and 54 are biased toward each other and a worker must use some sort of lever, usually a crowbar, to separate the shoes far enough away from cam 56 such that the rollers may be inserted therebetween. The chance for slippage is great and workers have been known to injure themselves more than occasionally performing this method of brake installation.

The method of brake installation using the present invention greatly simplifies the process in addition to all but eliminating brake installation related worker injury. Using the invention, the worker begins the installation process by setting the shoes 52 and 54 on a work surface and installing their respective retaining pins 90 and 92 as with the prior art method. This is followed by installing rollers 60 and 62 upon respective shoes 52 and 54 in the laterally aligned grooves in flanges 46, 66 and 68, 70 adjacent ends 76 and 78, respectively. (There are retainers which hold rollers 60 and 62 in place upon shoes 52 and 54 which are not shown for purposes of clarity) The top shoe 52 is then positioned on top of backing plate 56 with roller 60 abutting cam 56 which has been rotated to the fully released position shown by manually turning slack adjuster 112. A first end of large spring 88 is hooked to retaining pin 90 and spring 88 is allowed to hang freely therefrom.

The other shoe 54 is then positioned along the bottom of backing plate 56 with end 78 thereof positioned upwardly to the left of cam 56 such that the bottom end of spring 88 may be hooked onto retaining pin 92. Shoe 54 is then carried back towards the right whereby roller 62 is positioned against and beneath cam 56 as seen in the fully assembled condition in the Figures. The opposite end 82 of shoe 54 is easily manipulated into the position engaging anchor pin 86 against the laterally aligned grooves in flanges 68 and 70. The assembly is completed with installation of springs 94 and 104 upon shoes 52 and 54 as follows.

Plate 10 is slidingly positioned between shoes 52 and 54 by positioning slot 24 adjacent the outer edge of end 80 of shoe 52 with slot 30 positioned adjacent the outer edge of end 82 of shoe 54. Concave edge 16 of plate 10 faces inwardly to lie between shoes 52 and 54 while straight edge 18 faces outwardly to lie outside of shoes 52 and 54. The planar surfaces 12 and 14 of plate 10 should lie in a plane parallel to the plane at which flanges 64 and 68 lie and be spaced slightly outwardly therefrom as seen in FIG. 4. To anchor the bottom end 98 of spring 94 into hole 102 in flange 68, the shaft 36 of lever 32 is positioned beneath boss 15 extending from plate surface 14 as seen best in FIG. 5. To increase stability, one of the indentations 46, 48 or 50 may be placed in firm contact with boss 15. Alternately, boss 15 may be passed through slot 44 in shank 36 for further stability with boss 15 slidable therein to achieve the desired position. End may then be inserted over hooked end 98 and urged downwardly by lifting handle 34 with shaft 36 being levered against boss 15. In this way, end 98 of spring 94 may be brought adjacent hole 102 by tensioning spring 94 and inserting it therein with lever 32. The annular grooves 40 and 42 adjacent end 38 may be used to increase the frictional contact between end 38 and spring end 98 by positioning either groove against end 98. Once end 98 has been firmly anchored into hole 102, plate 10 may be slid out from between shoes 52 and 54 in a direction opposite to which it was slid into position.

Anchoring end 108 of the second small spring 104 into hole 110 requires placement of plate 10 between shoes 52 and 54 adjacent flanges 66 and 70 as seen in FIG. 6. Slots 24 and 30 are thus positioned to slide along ends 80 and 82 of shoes 52 and 54, respectively, until plate 10 lies adjacent and is in a plane spaced and substantially parallel to flanges 66 and 70. Edge 18 faces outwardly and edge 16 faces inwardly. Lever 32 is positioned between plate 10 and flange 70 beneath boss 15 extending from plate surface 14. End is positioned over spring end 108, preferably engaging either groove 40 or 42 therewith. Shaft 36 is placed firmly against the underside of boss 15 (again, either by passing through boss 15 through slot 44 or against one of the indentations 46, 48 or 50). Handle 34 is then lifted with shaft 36 bearing against boss 15 such that end 38 tensions spring 108 downwardly to hole 110. The worker may then easily manipulate spring end 108 into hole 110 with lever 32 to anchor spring 104 thereto. Lever 32 and plate 10 are then removed from the brake assembly with springs 94 and 104 firmly anchored between shoes 52 and 54.

There is thus provided a simple combination of tools which are worked together as fulcrum and lever to install (and remove, in a like manner) the springs anchored between a pair of brake shoes, the arrangement of which may be found in drum-type brake assemblies such as the ROCKWELL Q-PLUS. It should be apparent to those skilled in the art that the exact configuration and dimensions of the tools, especially plate 10, may be altered to fit the type of brake assembly one is working on. The main requirement of the dimensions of plate 10, including the slots 24 and 30, are such that plate 10 may be slidingly positioned between the shoes with the facing ends of the shoes fit inside the slots at either end of the plate. The plate and boss 15 should provide a steady fulcrum for working of lever 32 thereon. Although the preferred embodiment of the invention has been described herein, it will be appreciated that modifications may be made without departing from the full scope of the invention as set forth in the following claims.

What is claimed is:

1. A pair of first and second spring tools for cooperative use in attaching and removing a spring having first and second, opposite ends to and from spring anchoring means on first and second brake shoes, respectively, said shoes mounted for cooperative operation in a drum-type brake assembly, said spring extending between and biasing said shoes in a direction towards each other when said spring is attached to said brake shoes, said first tool comprising:

a) a rigid plate of predetermined outline having opposite, planar surfaces and first and second slots defined by said support element first and second edges into which a respective one of said facing ends of said shoes may be slidingly and removably positioned such that said plate extends and is frictionally held between said facing ends of said shoes, said plate including fulcrum means comprising at least one boss mounted to and extending normal from one of said planar surfaces; and b) said second tool comprising lever means having a first, proximal end for manual grasping thereof, and a second, distal end configured to engage said first spring end with said second spring end anchored to said anchoring means on said first brake shoe, said lever means having a segment extending between said proximal and distal ends adapted to be abutted and levered against said fulcrum means to frictionally engage and urge said first spring end with said distal end of said lever means into or out of engagement with said spring anchoring means on said second brake shoe.

2. The invention according to claim 1 wherein said proximal end of said lever means comprises a handle and said segment comprises a shank linearly extending from said handle, terminating into said distal end.

3. The invention according to claim 2 wherein said spring first and second ends are hook shaped and said shank includes at least one annular groove encircling said shank adjacent said distal end wherein said one of said hooked ends of said spring may be frictionally engaged.

4. The invention according to claim 3 wherein said shank further includes a plurality of longitudinally spaced indentations positioned along said shank between said handle and said groove.

5. The invention according to claim 4 wherein said shank further includes an elongated slot positioned longitudinally along and extending entirely through said shank adjacent said indentations.

6. A plate used in attaching and removing a spring having first and second, opposite ends to and from spring anchoring means on first and second brake shoes, respectively, said shoes mounted for cooperative operation in a drum-type brake assembly, said spring extending between and biasing facing ends of said shoes in a direction towards each other when said spring is anchored to said brake shoes, said plate being rigid with opposite surfaces and of a predetermined outline including first and second, opposite edges defining first and second slots into which said facing ends of said shoes may be removably and slidingly positioned, respectively, with said plate extending therebetween, said plate further including fulcrum means fixedly anchored thereto in a position between said first and second, opposite edges whereby a lever may be abutted and levered against said fulcrum means, the distal end of said lever used to engage and move said second spring end into or out of engagement with said spring anchoring on said second brake shoe when said first spring end is anchored to said spring anchoring means on said first brake shoe.

7. The invention according to claim 6 wherein said fulcrum means comprises at least one boss mounted to and extending from at least one of said plate surfaces.

8. A lever used for attaching and removing a spring having first and second, opposite ends to and from spring anchoring means on first and second brake shoes, respectively, said shoes mounted for cooperative operation in a drum-type brake assembly, said spring extending between and biasing said shoes in a direction towards each other when said spring first and second, hooked ends are anchored to respective said spring anchoring means on said brake shoes, said lever comprising a handle portion with a linear shank extending therefrom terminating in a distal end, said distal end including at least one annular groove encircling said shank wherein said first spring end may be frictionally grasped with said second spring end anchored to said spring anchoring means on said first brake shoe, and move said first spring end into or out of engagement with said spring anchoring means on said second brake shoe by abutting and levering said shank against stationary fulcrum means positioned between said first and second brake shoes, said lever further including a plurality of indentations longitudinally spaced along said lever shank between said handle and said distal end.

9. The invention according to claim 8 and further including an elongated slot formed longitudinally along said shank adjacent said indentations.

* * * * *